United States Patent [19]
Adams et al.

[11] 3,813,192
[45] May 28, 1974

[54] CENTERING SPRING ARRANGEMENT FOR OSCILLATORY COMPRESSORS

[75] Inventors: Glen O. Adams; Owen H. Scheldorf, both of Louisville, Ky.

[73] Assignee: General Electric Company, Louisville, Ky.

[22] Filed: Dec. 7, 1972

[21] Appl. No.: 313,153

[52] U.S. Cl. .............................................. 417/416
[51] Int. Cl. ............................................ F04b 17/04
[58] Field of Search ........................... 417/416, 417

[56] References Cited
UNITED STATES PATENTS

| | | |
|---|---|---|
| 2,865,559 | 12/1958 | Gigler .............................. 417/416 |
| 3,007,625 | 11/1961 | Dolz ................................. 417/416 |
| 3,018,735 | 1/1962 | Schindler ......................... 417/416 |
| 3,143,281 | 8/1964 | Dolz ................................. 417/416 |
| 3,355,676 | 11/1967 | Omura et al. .................... 417/416 |

*Primary Examiner*—C. J. Husar
*Attorney, Agent, or Firm*—Francis H. Boos, Jr.

[57] ABSTRACT

Those transverse loading forces deriving from the usual compression springs used to center the armature and piston of an oscillatory compressor are ameliorated, and in some cases eliminated, by the substitution of constantly tensioned, tension springs for the conventional compression springs.

3 Claims, 4 Drawing Figures

CENTERING SPRING ARRANGEMENT FOR OSCILLATORY COMPRESSORS

BACKGROUND OF THE INVENTION

The primary reciprocatory elements of an electromagnetically operated, oscillatory compressor comprise a single piston and rigidly interconnected, annular armature concentric with the piston. The piston and armature are mounted for conjoint reciprocation in a compression cylinder and annular air gap, respectively, under the combined influences of an electromagnetic driving force and opposed spring system. The single piston and cylinder constitute the sole, close tolerance, reciprocating guide structure for maintaining concentricity of the reciprocating parts with the result that compressors of this type are highly susceptible to impaired performance as a function of applied loading forces transverse to the axis of reciprocation. Stated differently, any loading component other than coincident with the cylinder and piston centerlines tends to "cock" the piston resulting in excess friction and/or seizing. It will be appreciated that the magnitude of the foregoing problem, which is obviously present to some degree in any piston/cylinder combination, is greatly magnified in the case of the relatively small diameter piston/cylinder combination necessarily employed with the limited driving force available from an electromagnetic motor.

Conventionally, opposed compression springs respectively bottomed on opposite fixed casing walls and engaging opposite sides of a yoke rigidly interconnecting the armature and piston are used to null the piston and armature. These are necessarily heavy compression springs whose spring constant is selected not only to damp relative reciprocation upon cessation of armature excitation and assist return from a power stroke, but, also, to insure that the springs remain in compression at opposite ends of the reciprocating stroke length. The latter for the reason that relaxation of the applied compression destroys the additional spring function of resisting transverse loading forces. Due to the heavy duty nature of these compression springs it is apparent that they produce a substantial loading force on the piston/cylinder combination and it is therefore critical that the applied spring force lie along the spring/piston/cylinder centerlines. An obvious criteria of force application concentric with a coil compression spring is that the reactant spring surfaces, i.e., those engaging the biased structures, lie perpendicular to the axis of spring action. Conventionally, these reactant surfaces are ground perfectly flat with respect to a spring installation plane perpendicular to the spring axis.

Notwithstanding the expensive and time consuming nature of such required machining operations to insure substantial coaxial spring force application, the use of compression centering springs presents another and distinct problem; that of resisting self realignment of the piston/cylinder centerlines following the application of a misaligning force vector. Thus the rapidly reciprocating piston provides a normal centering force to restore centerline alignment following misalignment from any of various external loading forces such as the establishment of second and third harmonics at high frequency reciprocation, for example. This normal restoring force is resisted to some degree by the compression spring arrangement by virtue of the relatively fixed end spring connections since the springs, too, tend to become cocked.

A further disadvantage in the use of compression centering springs arises from the necessity for maintaining the springs in compression at all reciprocating positions thereof with the concomitant likelihood of adjacent spring coil impact as one or the other of the centering springs is driven toward maximum compression. This, of course, results in "buckling" of the spring which produces a substantial x-y force vector tending to "cock" the piston.

A general recognition and discussion of the deficiences in prior art compression spring mountings as applied to compressors of the type under consideration appears in U.S. Pat. No. 3,143,281 which discloses a compression spring mounting adapted to compensate for certain of these transverse loading forces.

The purpose of the present invention is to provide a centering spring arrangement for an electromagnetically operated, oscillatory compressor which does not require separate spring machining operations; is not subject to buckling under load; and whose spring anchor or reactant surfaces provide relative freedom of movement in at least the $x$ and $y$ planes relative to the biased structures.

SUMMARY OF THE INVENTION

The usual compression centering springs are replaced by opposed annular arrays of constantly tensioned, tension springs whose reactant surfaces or anchor connections to the biased structures comprise spaced, pivotal connection points and whose collective, static bias is coaxial with the annular spring arrangement and cylinder centerline. Since the individual tension springs may be formed of identical lengths and spring constants their tension forces are equally applied with respect to the cylinder centerline so that no machining operations are required.

The pivotal spring connections provide substantial freedom of movement in the $x$ and $y$ planes while yet insuring that the biased structures are under continuous opposed spring load to preclude that tendency for piston "end play" which would be the result of an untensioned, or "loose," connection at the spring reactant surfaces.

Due to the fact that the springs are always under tension there is less likelihood of adjacent coil impact (i.e., the spring length and lay may be chosen to preclude adjacent impact so long as the springs are maintained under tension) and any such impact as might occur would have little effect on piston alignment since the force imbalance created thereby is, effectively, added to zero at the respective pivotal connections.

DESCRIPTION OF THE PREFERRED EMBODIMENTS

Figure 1:
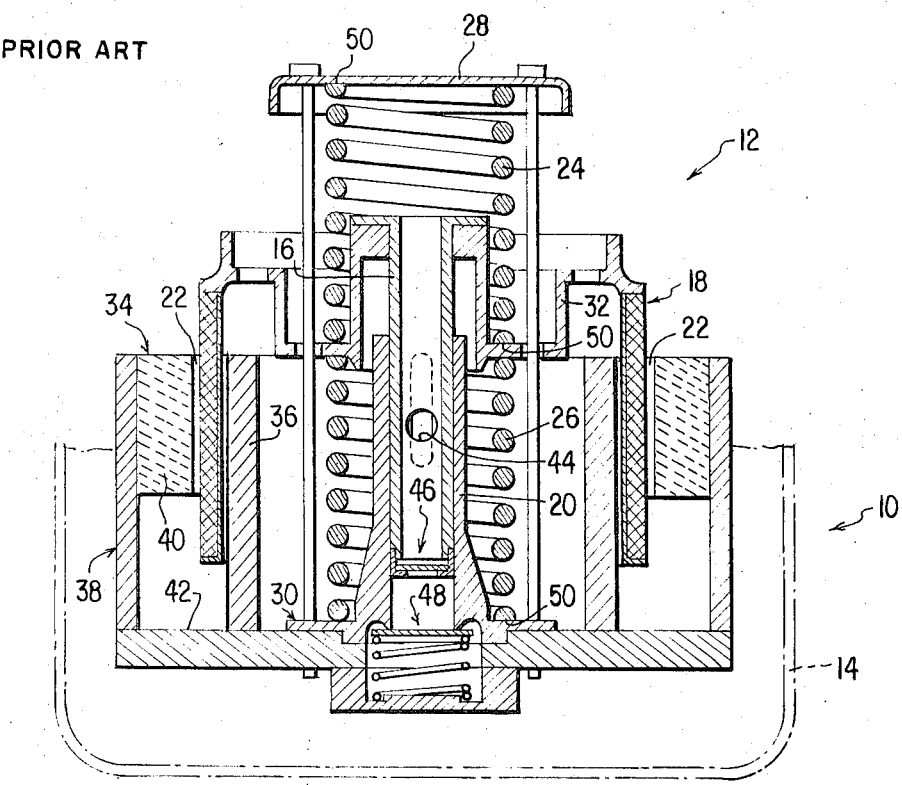
FIG. 1 is a vertical section taken through the casing of an oscillatory compressor illustrating a conventional centering spring arrangement.

In FIG. 1 is illustrated an oscillatory compressor 10 whose casing 12 is supported within a sealed compressor housing 14. A piston 16 and annular armature 18 are mounted for conjoint reciprocation in compression cylinder 20 and annular air gap 22, respectively. Opposed compression springs 24, 26 are respectively bottomed against upper and lower casing walls 28, 30 with their proximate ends engaging opposite sides of a yoke 32 rigidly interconnecting the piston and armature. Air gap 22 is defined between the annular pole pieces 34, 36 of a magnetic circuit 38 which is energized by permanent, ceramic magnets 40 comprising annular pole piece 34. Compression cylinder 20 is rigid with the compressor casing and is surrounded by the annular pole pieces which are rigidly interconnected by a soft iron return path 42 comprising a portion of the lower casing wall. Hollow piston 16 includes the usual intake port 44 and intake valve 46, compressed gas being discharged exhausts through dischage valve 48.

Inasmuch as the single piston/cylinder combination constitutes the sole, close tolerance guide structure for the relatively reciprocable parts and since the limited driving force available from an electromagnetic motor dictates the use of a relatively small diameter piston/cylinder, it is obvious that control of transverse loading forces is an important design parameter for oscillatory compressors. The necessary presence of strongly biased centering springs undergoing rapid contraction and extension as a function of piston and armature reciprocation on the order of 60 cps represents a built-in loading force which, if not balanced with respect to the piston/cylinder centerline, will produce transverse loading.

The conventional approach to a basic requirement that the usual, concentric, compression centering springs exert at least their static bias parallel to the axis of reciprocation is illustrated in FIG. 1 wherein the reactant surfaces 50 of the springs (i.e., those spring portions engaging the biased structures) are ground, as necessary, to present cumulative reactant surfaces which lie perpendicular to the axis of spring reciprocation. These relatively large area, end bearing spring surfaces are virtually immune to transverse shifting to accommodate misalignment as will be apparent from the foregoing discussion and an inspection of FIG. 1.

Figure 2:
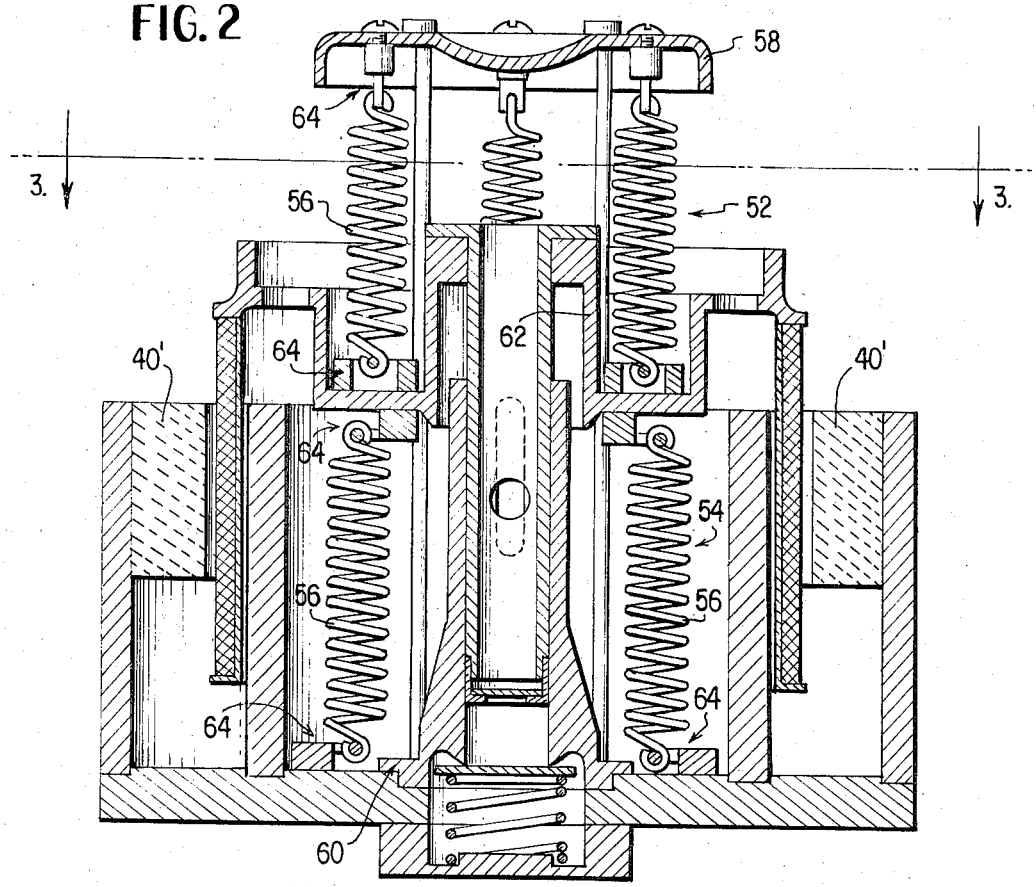
FIG. 2 is a similar view of an oscillatory compressor employing opposed, annular arrays of constantly tensioned, tension springs for centering the piston and armature.
Figure 3:
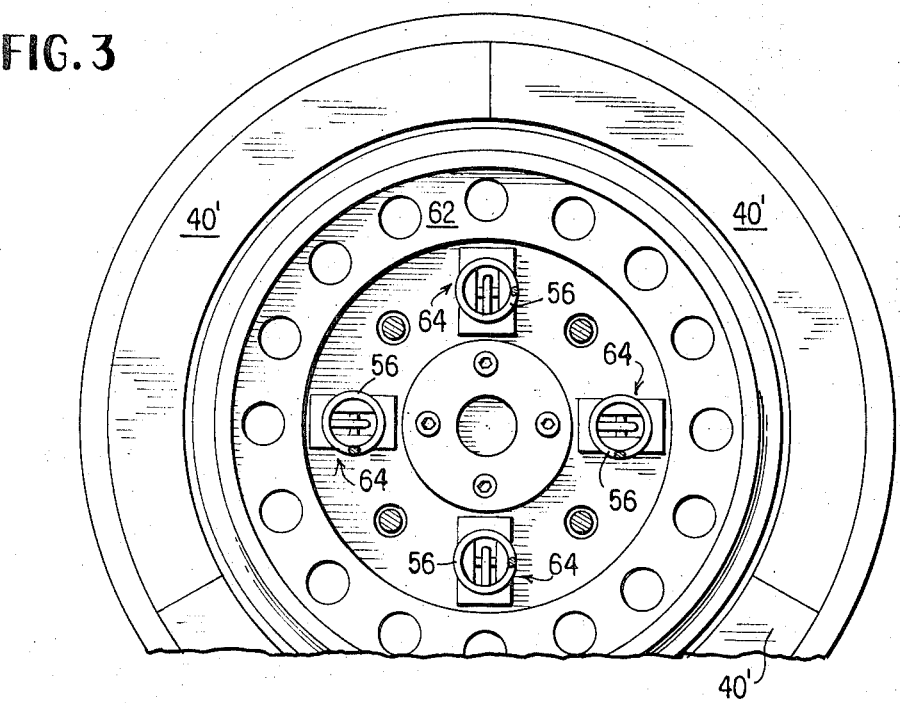
FIG. 3 is a fragmentary cross-section taken along line 3—3 of FIG. 2.

In FIGS. 2 and 3 is illustrated compressor casing structure employing the annular array of magnets 40' and identical to that of FIG. 1 except for the replacement of the compression centering springs 24, 26 with upper and lower annular tension spring arrays 52, 54. Each spring array 52, 54 comprises four identical springs 56 which are anchored to the opposed casing walls 58, 60 and yoke 62 via pivot connections 64. The lengths and constants of springs 56 are chosen to insure that all of the springs remain in tension during all positions of reciprocating piston movement to preclude "end play" of the piston. Since each spring reactant surface comprises, basically, a pivot point and since all of the pivot or anchor points are at widely spaced locations; grinding or other spring machining operations are not required. Due to the fact that each spring connection, or pivot, permits at least limited realignment in both the $x$ and $y$ planes the springs, themselves, do not resist the natural realigning force exerted by the reciprocating piston following the application of extraneous transverse forces.

Figure 4:
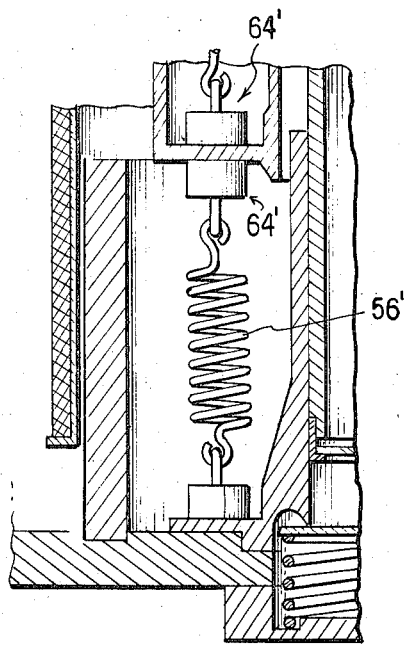
FIG. 4 is a detail view of a slightly modified spring arrangement.

A slightly modified spring 56' and anchoring pivot connections 64' are illustrated in FIG. 4 which may be substituted for the corresponding springs and connections in FIGS. 2 and 3.

We claim:

1. In an electromagnetically operated, oscillatory compressor including a piston and armature interconnected by a yoke and mounted for conjoint reciprocation within a cylinder and air gap, respectively, under a continuous bias of opposed centering springs, the improvement comprising: all of said opposed centering springs comprising tension springs maintained in tension throughout the range of reciprocating piston and armature travel, said opposed centering springs comprising opposed, annular spring arrays respectively connected to opposite sides of a yoke interconnecting said piston and armature; and each of the spring connections comprising a pivot connection.

2. The compressor of claim 1 including a compressor casing rigid with said cylinder; and said tension springs being pivotally interconnected between said casing and yoke.

3. The compressor of claim 1 in which each array comprises four spaced, identical tension springs.

* * * * *